United States Patent [19]

Dugger et al.

[11] 4,291,533
[45] Sep. 29, 1981

[54] SUPERSONIC RAMJET MISSILE

[75] Inventors: Gordon L. Dugger; Frederick S. Billig, both of Silver Spring, Md.

[73] Assignee: The United States of America as represented by the Secretary of the Navy, Washington, D.C.

[21] Appl. No.: 517,801

[22] Filed: Dec. 30, 1965

[51] Int. Cl.³ .............................................. F02K 3/00
[52] U.S. Cl. .................................. 60/240; 60/270 R; 102/374; 137/15.2
[58] Field of Search ................. 60/235, 243, 270, 240, 60/270 R; 137/15.1, 15.2; 138/44–46; 102/49 J, 49 S

[56] References Cited

U.S. PATENT DOCUMENTS

| | | | |
|---|---|---|---|
| 2,540,594 | 2/1951 | Price | 60/240 |
| 2,693,675 | 11/1954 | Schaffer | 60/243 |
| 2,939,277 | 6/1960 | Wise | 138/46 |
| 3,080,708 | 3/1963 | Carr | 60/208 |
| 3,092,960 | 6/1963 | Worley et al. | 60/243 |

Primary Examiner—Harold J. Tudor
Attorney, Agent, or Firm—R. S. Sciascia; A. L. Branning

[57] ABSTRACT

1. In a supersonic combustion ramjet missile,
a body,
an innerbody having a portion within the body and a portion projecting forwardly therefrom,
said innerbody being spaced from said body to define an inlet for compressing an air flow from a hypersonic flight Mach number to a supersonic flight Mach number,
said body having therein a combustion chamber, an exhaust nozzle and a fuel tank,
nozzles in the wall of the combustion chamber for discharging fuel from the tank into said chamber,
means in the body and providing fuel flow rate adjustment as a function of Mach number and altitude to control fuel-air equivalents ratio to effect desired missile operation,
said means including sensors communicating with the combustion chamber, a distribution valve, a fuel pump and a turbine meter connected between the tank and the valve, a turbine driving the fuel pump, a sensor control unit connected to the valve, one of said sensors being connected to said unit and another to said valve, a computer for controlling said turbine, said turbine meter and said sensor control unit, and means for supplying control signals to the computer representative of pitot and static pressures impinging on the forward end of the innerbody,
said innerbody being shiftable axially within said body in response to Mach number changes, whereby shock waves will be maintained at optimum positions between the body and the innerbody.

10 Claims, 7 Drawing Figures

SUPERSONIC RAMJET MISSILE

The present invention relates generally to aerial vehicles. More particularly it relates to an improved supersonic combustion ramjet missile.

Investigations have revealed that missiles having higher speed capabilities than present missiles will be required for defense against future air-to-surface missiles, on-the-deck attacks, and Intermediate Range Ballistic Missile (IRBM) attacks.

Research in advanced airbreathing propulsion systems has been an integral part of weapon development programs since their inception. In recent years the potentialities of airbreathing systems designed for flight at hypersonic speeds (above Mach 5) have been investigated. Theoretical studies have shown the possibility of propelling ramjet vehicles with hydrogen fuel to orbital speeds and with storable fuels to Mach 15 or above. Experimental work with the external ramjet and related configurations has demonstrated the feasibility of engines employing supersonic combustion.

It has been determined that effective defense against future air-to-surface missiles, on-the-deck attacks, and IRBM attacks will require major reduction in time-to-intercept of the defense missiles, compared with presently available surface-to-air missiles. For the foreseeable future, effective intercept of ballistic missile warheads, as well as air-supported attacks, will occur within the atmosphere, because the atmosphere provides the best means for distinguishing between the ballistic warhead which must be destroyed and extraneous re-entering material accompanying the warhead to which firepower must not be diverted. The margin of superiority of ramjet missiles to rockets increases rapidly as missile speed increases. To provide equivalent performance to a Mach 7 supersonic combustion ramjet vehicle at sea level, a rocket would have to have roughly three times as much weight.

As an important object, therefore, the present invention provides a missile, comparable with length and volume requirements of the Terrier rocket missile system, which would accelerate from Mach 4.0 at an average of 32 g's to a cruise speed of between Mach 6.5 (7257 ft/sec) and Mach 7 (7810 ft/sec) at sea level, and at speeds between Mach 8.5 (8296 ft/sec) and Mach 10 (9676 ft/sec) at altitude.

As another object, the invention provides a missile having a range that would be equivalent to the well-known Typhon long range ramjet missile, and which, on an optimum cruise trajectory would reach 200 nautical miles range in approximately 2.3 minutes, and with a 100-g rocket boost to Mach 4 and subsequent self-acceleration on a vertical trajectory, would reach 50,000 feet in 8 seconds and 100,000 feet in 13 seconds.

As a further object, the missile features the simplicity of construction characteristic of the supersonic combustion design, thus enhancing prospects for reliable low cost production.

Other objects and many of the attendant advantages of this invention will be readily appreciated as the same becomes better understood by reference to the following detailed description when considered in connection with the accompanying drawings, wherein.

The structural design of the improved missile is based on the use of thermal protection for all surfaces, which allows a major portion of the airframe to be based on conventional high-strength, low-temperature alloys of titanium or magnesium. Alternate combinations of structural metals plus protective insulation are within the scope of this invention; for example, refractory metals such as TZM Molybdenum and insulating materials such as pyrolytic graphite and char-forming ablative plastics. In particular, it is expected that internal ducts may be lined with pyrolytic graphite. The nose tip and the leading edge of the cowl will require special refractory materials; for example, boron nitride or thoria, alternative composite materials such as tungsten or graphite coated with a high-temperature oxidation-resistant coating, for example, zirconia, thoria or silicide, are also within the scope of the invention. For speeds in the neighborhood of Mach 10 and higher, active cooling of the leading edges by transpiration of water or other fluids through a porous material is within the scope of the invention.

Figure 1:
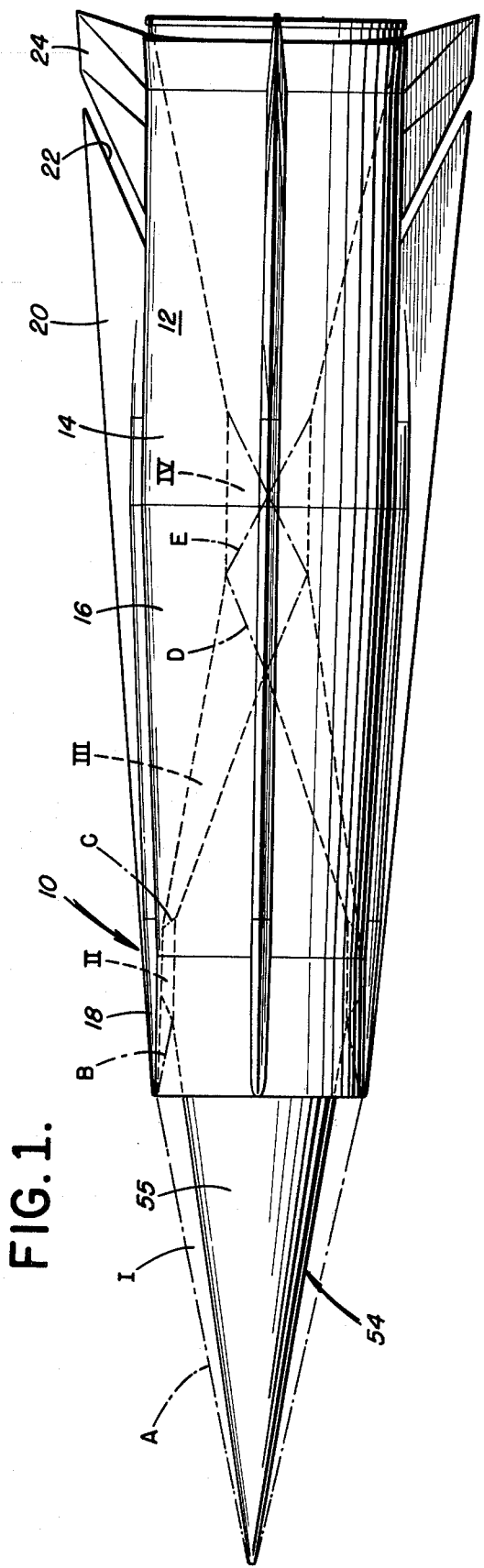
FIG. 1 is a side elevation of the missile, the interior configuration being indicated in dotted lines and the shock wave pattern being shown in broken lines.

FIG. 1 depicts the suggested all-purpose supersonic combustion ramjet missile. It is 135" long with an 18" diameter inlet and a base diameter of 22.1". It is understood that these dimensions represent a reasonable configuration for a general-purpose fleet missile with the performance capabilities cited. Greater thrust and acceleration capability can be achieved by increasing missile diameter, whereas greater range can be achieved by increasing missile length and fuel capacity for a given diameter; trade-offs between length and diameter within a given weight or volume limitation can be made to satisfy the most important mission specification as required. The missile has four highly-swept delta wings and tail controls (or flippers) in a cruciform (90° apart) configuration of 44.5" maximum span. Thus, the lateral body dimensions of the missile are similar to those of the TYPHON long range missile, which has a 16" body cylinder but measures 23" across the dorsal fins used for packaging; however, the improved missile is 50" shorter and 18.5" smaller in maximum span. It is understood that the wingspan and the associated tail controls also have been selected for a general-purpose missile in order to provide high maneuverability at high altitude, for example, 15 g at 80,000 ft. Much smaller wings can be employed if low-altitude roles are to be emphasized, and such change will cause only a moderate reduction in altitude performance, because very narrow wings can double the body-only lift coefficient curves at hypersonic speeds. With a nuclear warhead plus adequate space and weight allowances for all other components (guidance, controls, telemetering, fuel system, and even trapped or residual fuel) its dry weight is estimated to be 1072 lb and its fully fueled weight is 1410 lb.

Figure 2:
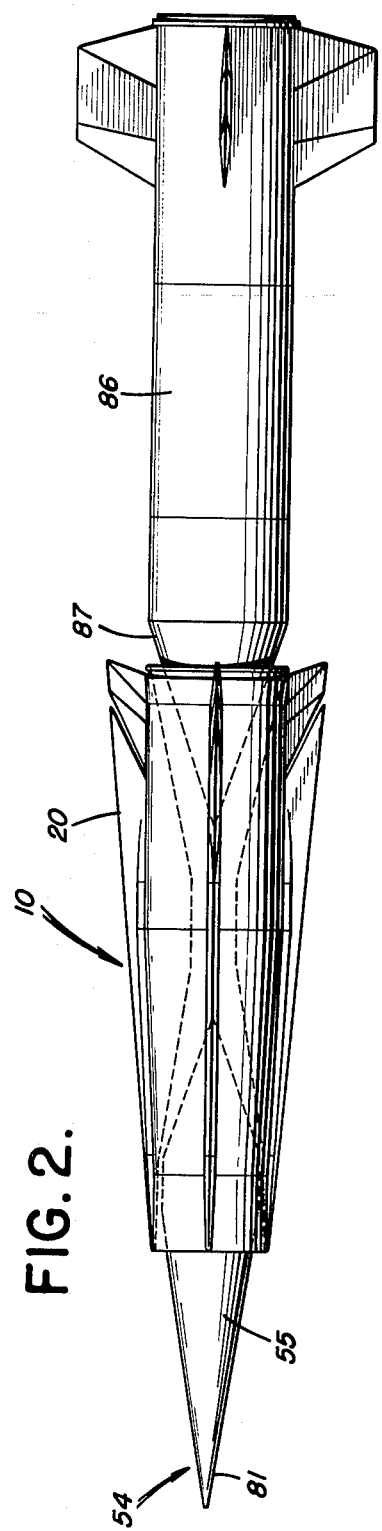
FIG. 2 is a side elevation, on a reduced scale, showing the improved supersonic missile in combination with a booster rocket, i.e., as a complete weapon.

A typical weapon configuration is shown in FIG. 2. For clean aerodynamic design, the booster employed has the same 22.1" diameter as the missile base. With this diameter, it would be a little more than 8 feet long, giving a total weapon length of approximately 20 feet. The booster headcap has a conical fairing which extends into the missile's nozzle. This permits efficient venting of air through the ramjet during boost and allows the ramjet's inlet to "start" smoothly prior to separation. In fact, if the improved engine uses a reactive high energy fuel, as suggested herein, the ramjet should be ignited during boost, to provide a small fraction of the total boost impulse and assure a clean, fast separation with immediate and continuous ramjet acceleration thereafter. If this practice is followed, and a rocket with specific impulse of 260 sec is provided, an average boost acceleration of 100 g's and a separation Mach number near 4.0 appear to be appropriate. A lower-acceleration booster can be employed if short-range defense is less important than considered here; for example, a 40-g booster will add 2.1 seconds to the flight time to any given target but it will also add approximately one nautical mile of powered-flight range. The Mach 4 separation speed leads to an estimated booster weight of approximately 1800 lb, giving a total weapon weight of approximately 3200 lb.

Referring again to FIG. 1, the improved missile per se is shown generally at 10. The missile 10 includes a tubular body 12 which has a cylindrical aft section 14, a tapered forward section 16, and a substantially cylindrical cowl 18. Outwardly swept fins or wings 20, arranged in cruciform configuration, extend throughout the major portion of the length of the body 12 and terminate in oblique edges 22. Mounted on the aft end portion 14 and in alignment with the wings 20 are steering fins 24.

Figure 3:
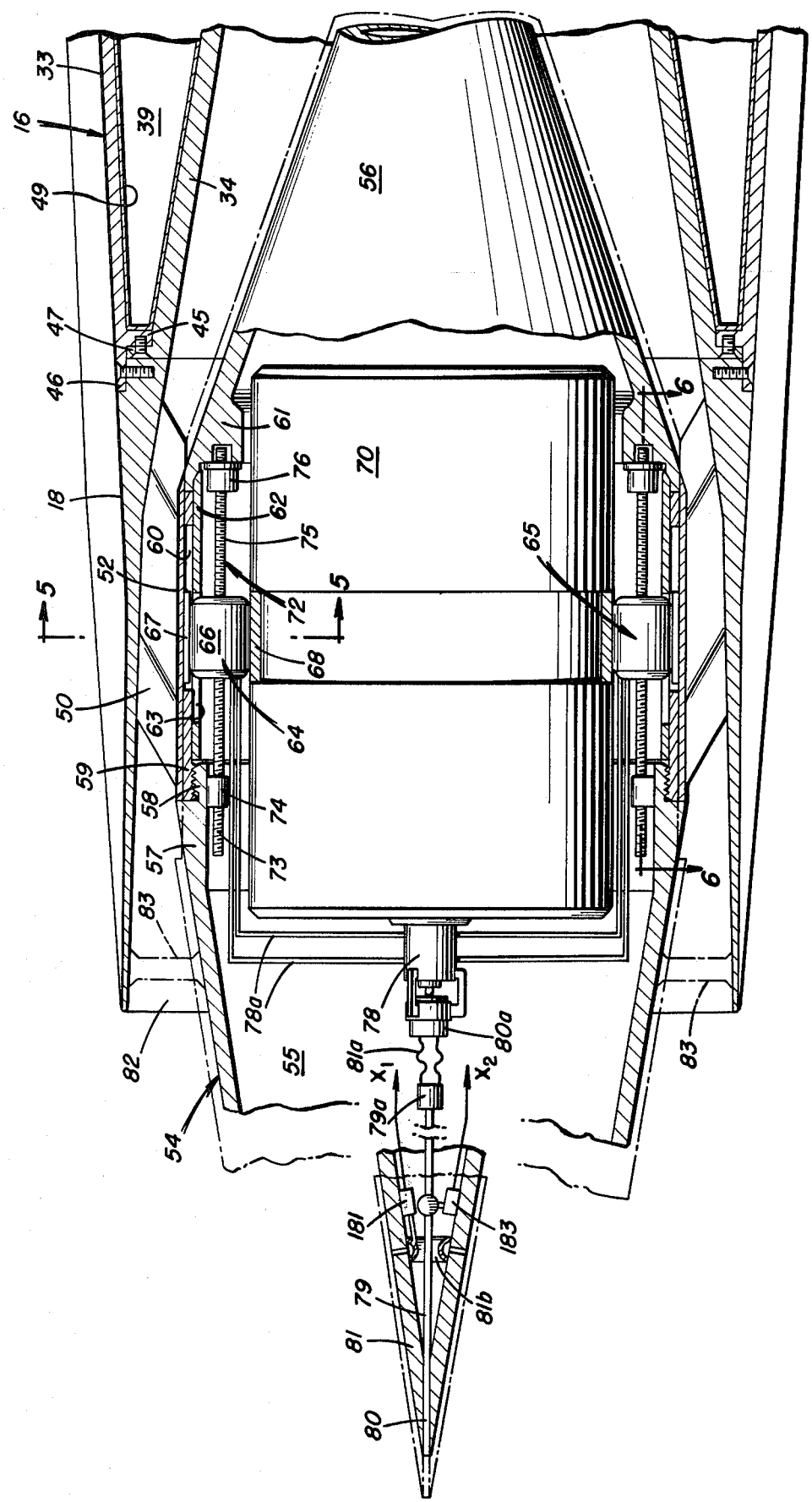
FIG. 3 is an enlarged longitudinal section, partially in elevation, showing the forward portion of the missile, and particularly illustrating the innerbody structure and the position adjusting means therefor.
Figure 4:
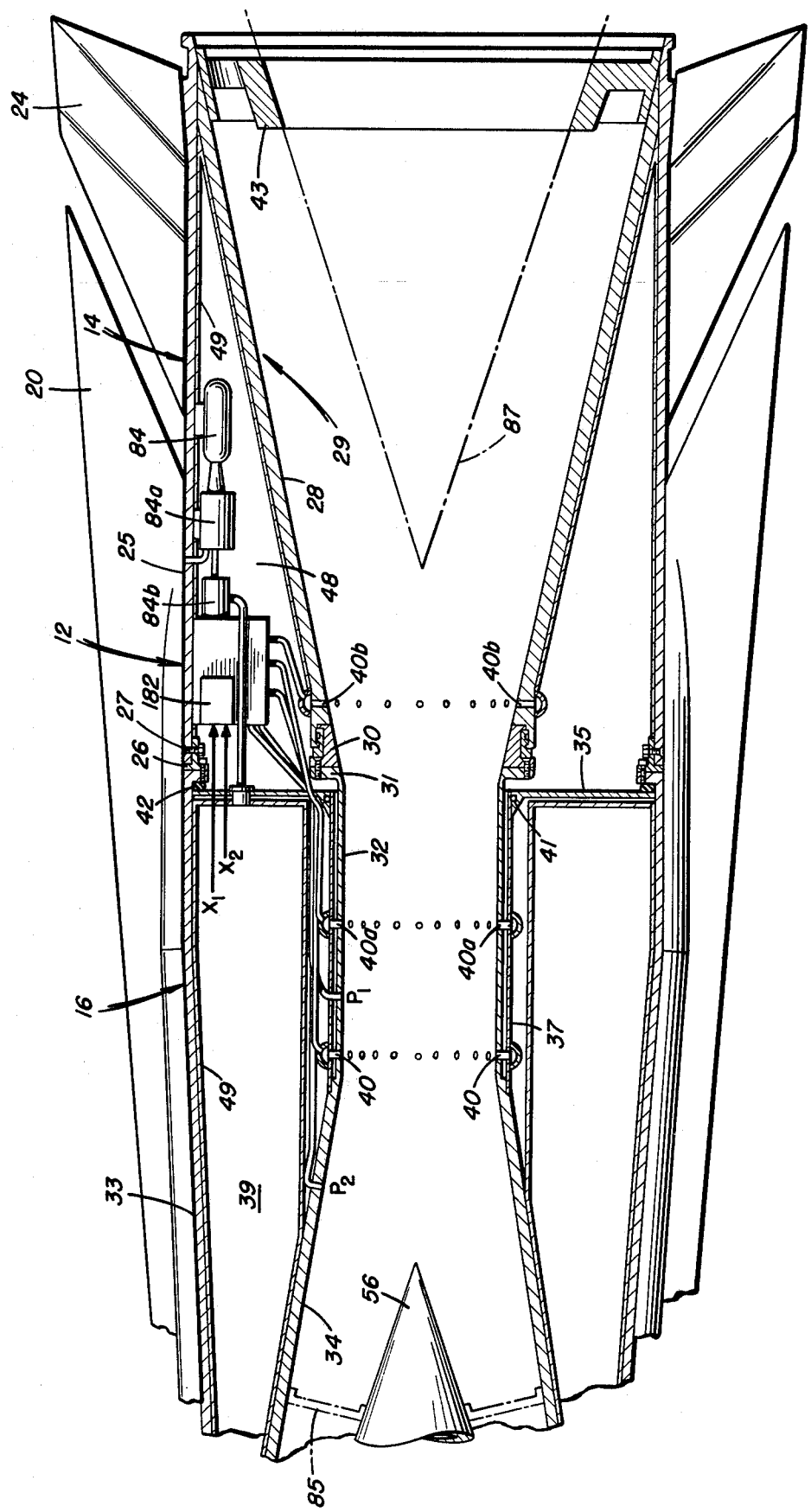
FIG. 4 is a section, on the same scale as FIG. 3, illustrating the structure of the aft portion of the missile.
Figure 5:
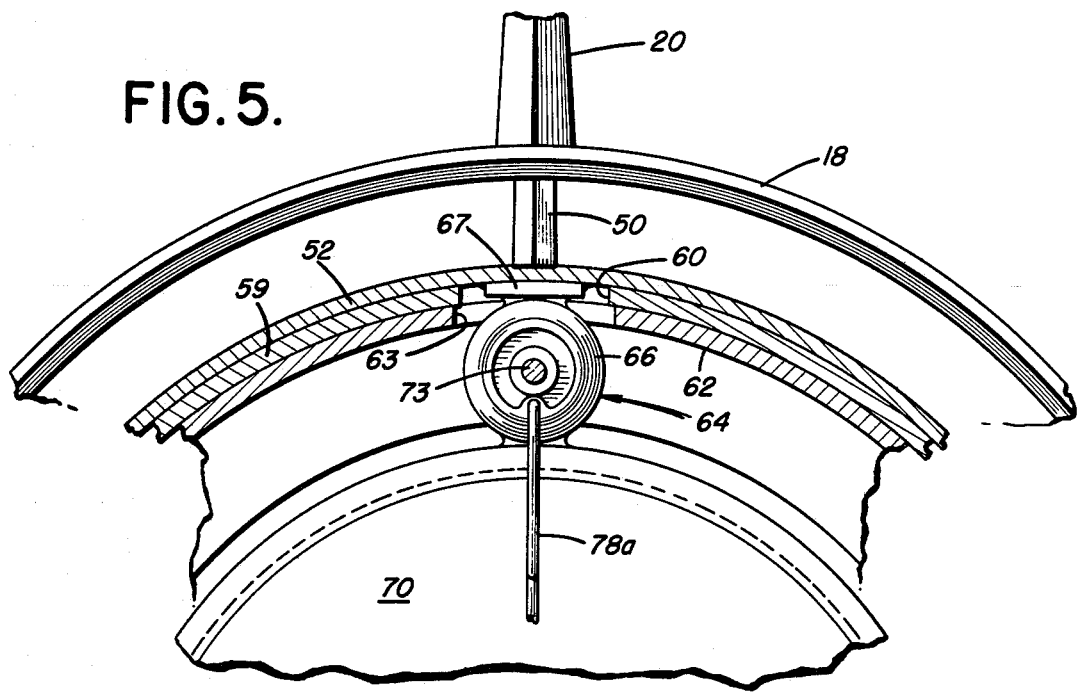
FIG. 5 is a detail section on the line 5—5 of FIG. 3.
Figure 6:
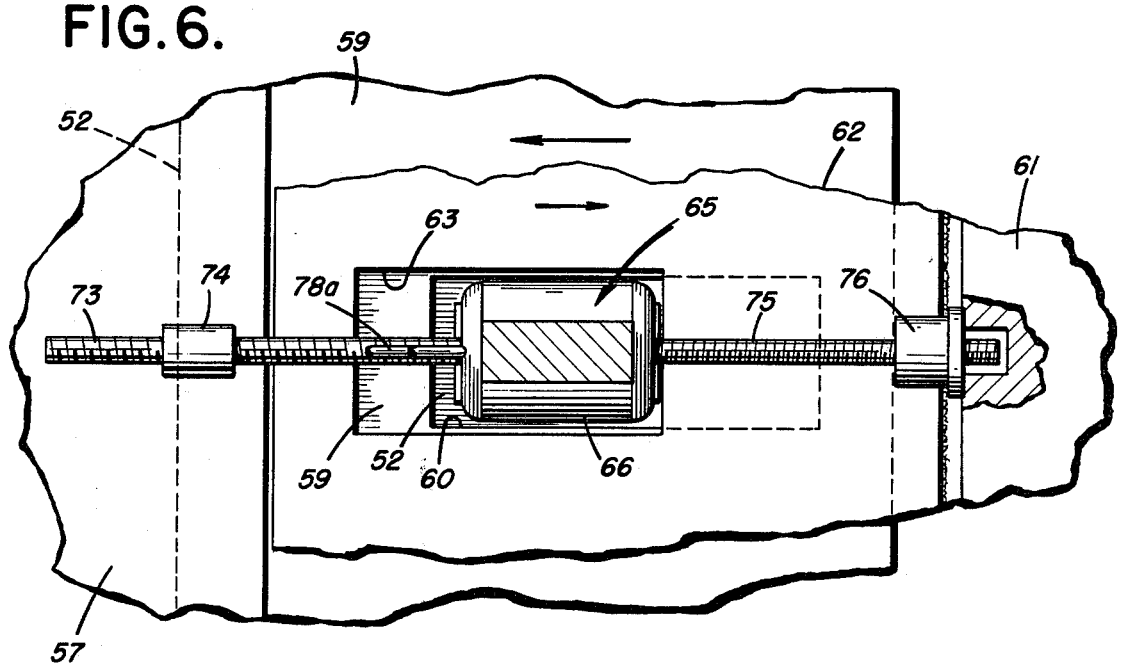
FIG. 6 is a detail section on the line 6—6 of FIG. 3.

As best seen in FIGS. 3 and 4, the sections 14, 16, and 18 are secured by suitable bolts to form the body 12. More specifically, as to the aft section 14, said section includes an outer wall 25 which is secured to a connecting ring 26 by bolts 27, and an inner tapered wall 28 that defines an exhaust nozzle 29. The inner, or forward, end of the nozzle 29 is secured to a coupling ring 30 which is, in turn, connected to a flange 31 on the aft end of a cylindrical combustion chamber 32 that forms a part of the forward section 16, now to be described.

The forward section 16 (FIG. 4) includes an outer wall 33, an inner wall 34 and an aft wall 35. The inner wall is tapered to define a diffuser and is integral with the combustion chamber 32. The aft wall 35 is secured to a sleeve 37 that surrounds the wall of the combustion chamber 32. Fuel is carried in a tank 39 which is mounted within the section 16 and surrounds the inner wall 34 (diffuser) and the combustion chamber 32. Suitable injectors in the walls 32 and 28, are shown schematically at 40, 40a and 40b. Note: simple holes may suffice. Suitable O-rings 41 and 42 seal the inner and outer rims of the wall 35 to insure against leakage from the tank 39. To provide an axial connection for the booster, to be described hereinafter, a booster coupling ring 43 is mounted in the exit end of the nozzle 29.

As shown in FIG. 3, the wall 33 of the forward section 16 is provided with radial and axial flanges 45 and 46, respectively, the radial flange 45 being connected to a flange 47 on the wall 34 and the axial flange 46 being secured to the aft end portion of the cowl 18. The walls 25, 28 and 35 form a recess 48 to receive missile guidance and control apparatus, as may be appropriate. A liner 49, of suitable insulating material, protects components in the recess from the effects of high temperatures.

Near its aft end the cowl 18 is provided with radially inwardly directed struts 50, to the inner ends of which is secured an annular member 52 for supporting the innerbody of the missile and mounting the positioning mechanism for said innerbody, now to be described.

The innerbody is shown generally at 54 and comprises relatively movable conical forward and aft sections 55 and 56. As best seen in FIG. 3, the forward end portion of the innerbody section 55 is provided with a relatively thick cylindrical wall 57, said wall being reduced to define a threaded end portion 58 to receive a sleeve 59 having an elongated slot 60 therein. Similarly, the aft section 56 of the innerbody has a thickened wall 61 which carries a sleeve 62 thereon, the sleeve 62 telescoping within the sleeve 59 and being formed with a slot 63 which registers with the slot 60.

To effect relative movement of the innerbody sections 55 and 56, drive mechanisms 64 and 65 are provided. Since the drive mechanisms are identical, a description of one will suffice for both. The drive mechanism 64 includes a motor 66 which is secured to a plate 67 that is attached to one of the struts 50. The motor of the drive mechanism 64 is mounted in a similar manner and is secured to a diametrically oppositely disposed strut 50. Both the motors are rigidly connected to a circular mounting bracket 68 that mounts a housing 70 which may contain a warhead, guidance equipment, or such other apparatus as may be appropriate.

The drive mechanism 64 includes a feed screw 72 that extends from opposite ends of the motor 66. The screw 72 has a relatively coarse threaded section 73 that engages in a nut 74 secured to the wall 57 of the forward section 55, and a relatively fine threaded section 75 that is operatively received in a nut 76 attached to the wall 61 of the aft section 56. The motor 66 is hydraulically operated and is controlled by a servomechanism 78 which is connected to said motor by lines 78a. In turn, the servomechanism 78 may be conveniently operated pneumatically by fluid pressure from a pitot tube 79 which extends forwardly within the innerbody section 55 and has its forward end portion 80 mounted in the apex, or nose 81, of said section. Pitot pressure is conducted to a transducer 79a which is connected to a motor 80a by flexible wires 81a. Alternatively, the motor 66 may be controlled by a servomechanism that relates the vehicle's flight Mach number by measured pitot and surface static pressures. The pitot pressure can be sensed at the apex 81 of the forward section, and the static pressure can be derived from measurements on the conical surface 54. To effect static pressure measurements, a manifold 81b conducts surface air to a transducer 181 which produces an electric signal fed to a computer 182 (FIG. 4) by a conductor $X_1$. Similarly, pitot pressure may be bled from the tube 79 and fed to a transducer 183 which supplies a signal to computer 182 through a conductor $X_2$.

As will now be understood, the innerbody 54 is mounted with its midportion and aft end portion within the open forward end of the body 12, the innerbody being supported axially of the main body and in spaced relation thereto by the struts 50. As will be seen, the innerbody 54 cooperates with the main body to define an inlet 82. The drive mechanisms 65 and 66 shift the innerbody sections 55 and 56 with respect to the cowl 18 in order properly to position the shock waves A, B, C and D (see FIG. 1). As an example, the sections 55 and 56 may be moved forward at relatively low speed and backward at relatively high speed. The coarse thread 73 provides for approximately 6.3 inches of movement for the forward section while the fine thread 75 produces approximately 1.7 inches of movement for the aft section. It should be recognized that the inlet depicted represents a high ratio of internal area contraction from air flow region I to air flow region IV (FIG. 1). To provide for the starting of supersonic air flow through this inlet, a temporary partial blockage in the region of the inlet 82 would be used. This blockage can be in the form of suitably shaped blocks of ablative material selected and designed to melt or sublime and pass through the engine at a flight Mach number near between 3 and 4, as shown in dotted lines at 83 in FIG. 3, or the blockage can be in the form of a diaphragm 85 (FIG. 4), located within the internal ducting and which will rupture at a pressure loading sufficient to give a high-pressure-ratio or impulse-type start.

Fuel which is admitted near the forward end of the combustion chamber 32 will cause a final oblique shock E (FIG. 1), so that the flow disturbance caused by the fuel injection actually serves as a part of the air compression system. The Mach number in the air flow after this final shock wave will be approximately $\frac{1}{3}$ of the flight Mach number. The heat release is expected to occur at nearly constant pressure. Additional portions of fuel may be added from the wall near the center of this cylindrical section, as by injectors 40a, and, for high thrust at Mach numbers between 4 and 5, some of the fuel may be added at the beginning of the divergent conical nozzle section, as by injectors 40b. A gas generator 84, a gas-driven turbine 84a and a fuel pump 84b in the recess 48 will be used to supply the fuel to annular manifolds around each of these three or more fuel injection stations. Flow rate will be controlled by the turbine pump based on pressure or Mach number sensing. A gas-pressurized by-pass line (not shown) of fixed fuel flow rate may be used to augment the supply from the pump for the higher flow rates needed during low-altitude acceleration.

Figure 7:
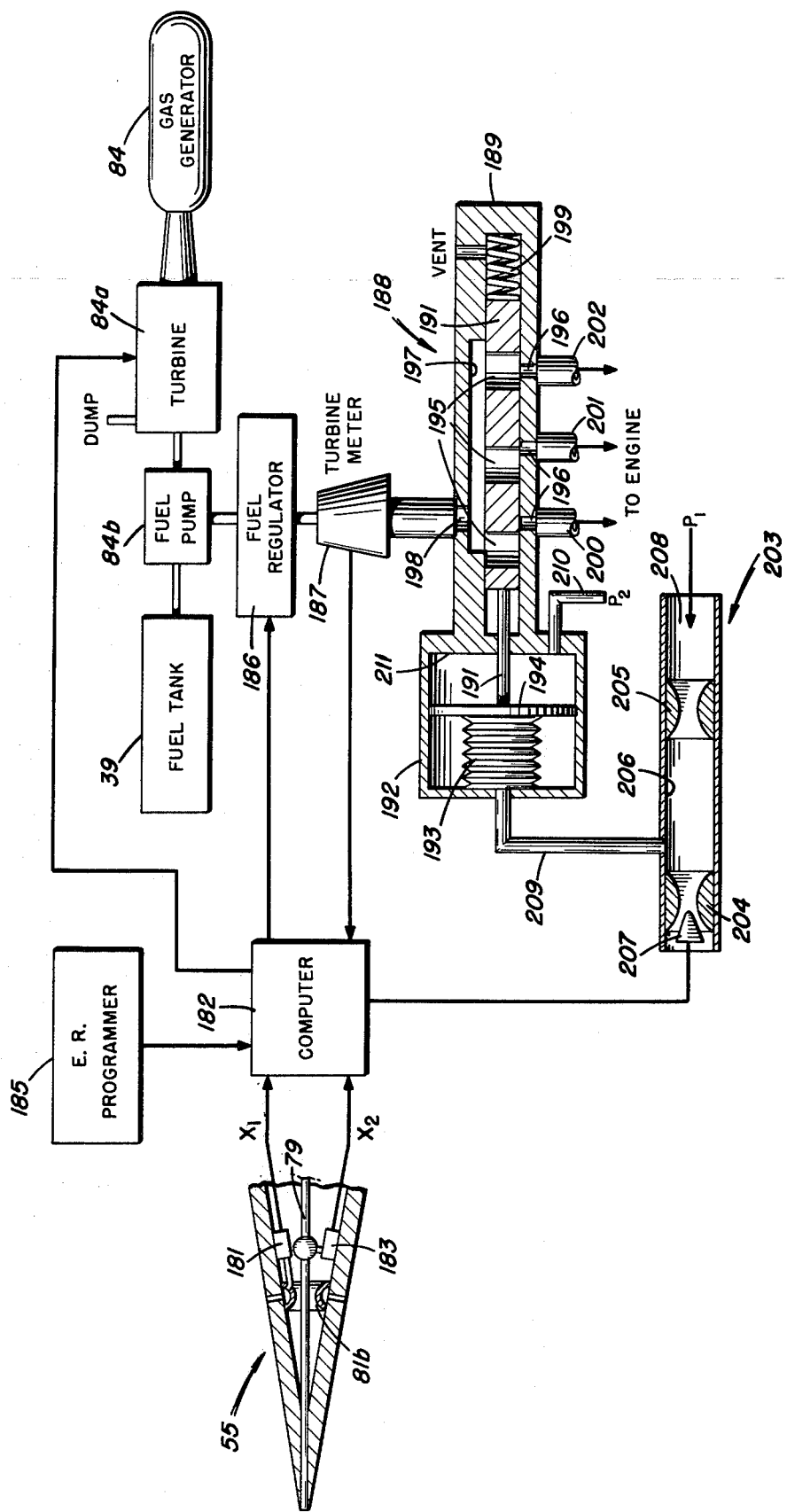
FIG. 7 is a diagrammatic view of the fuel distribution system.

The fuel control system is shown schematically in FIG. 7. It should be understood that variations in details of this system may be effected without departing from the scope of the invention. Reference numerals used in other figures, e.g., the computer 182 (FIG. 4) are employed, as appropriate. In FIG. 7 a fuel-air equivalents (E.R.) ratio control is shown at 185 and is connected to the computer 182. The control 185 provides fuel flow rate adjustment as a function of Mach number and altitude to effect the desired fuel-air equivalence ratio which is, in turn, a function of desired missile operation, i.e., acceleration (climb or dive) or cruise.

Fuel from the tank 39 is discharged from the pump 84b into a fuel regulator 186 and therefrom into a turbine meter 187, the fuel regulator and the turbine 84a being controlled by the computer 182. From the turbine meter 187 fuel flows into a distribution valve 188 which includes a housing 189, a valve element 190 having a stem 191, and an integral bellows casing 192 in which is mounted a bellows 193. The bellows 193 has its outer end secured to the inner surface of the outer end wall of the casing 192 and its inner end fixed to a plate or piston 194 which is also connected to the stem 191. The valve element 191 is formed with spaced ports 195 which are movable into or out of registry with discharge ports 196 in the bottom wall of the housing 189. A distribution chamber 197 is provided in the housing above the valve element and communicates with the turbine meter through an orifice 198. A spring 199 in the housing 189 maintains the valve element under compression. Fuel discharge pipes 200, 201, and 202 are connected, respectively, between the injectors 40, 40a and 40b and the discharge ports 196.

For controlling distribution valve 188 a sensor control unit 203 is employed. The sensor control unit includes restrictors 204 and 205 which define a chamber 206. The restrictor 204 is located at one end of the unit 203 and has a bleed plug 207 the movement of which is controlled by a suitable servo device (not shown) which is operated by the computer 182. The sensor control unit 203 is provided with an open end 208 which is connected to the sensor $P_1$ (FIG. 4). A tube 209 connects the chamber 206 with the interior of the bellows 193, and a pipe 210 connects a chamber 211, between the plate 194 and the inner end wall of the bellows casing, with the sensor $P_2$ (FIG. 4).

By supplying fluid under divergent pressures to opposite sides of the bellows 193 from the combustion chamber 32, for shifting the valve element 191, the sensors $P_1$ and $P_2$ adjust the fuel distribution so that the strength of the oblique shock wave between the two sensor locations cannot become excessive and therefore cannot lead to normal shock which could cause an interaction with the inlet. Thus the fuel system objective is to maintain supersonic flow through the combustor and a proper balance between the losses due to heat addition, shock waves, and chemical association, so as to optimize engine performance.

The relationship between the fuel control system and inlet control system can be illustrated by an example: If the computer, either in response to preprogrammed flight information or by a command from the ground, calls for acceleration, the fuel flow will be increased, with a resultant increase in missile speed. Such speed increase will cause an increase in Mach number at the nose, for causing the innerbody sections to shift for maintaining the shock waves in as nearly optimum positions as possible between the fixed body structure and the innerbody. (Shock wave E is controlled by fuel injection.) In this example the innerbody sections would move aftward in order properly to position the shock waves B and C as shown in FIG. 1.

In FIG. 2 there is shown the missile 10 as it would appear with a booster positioned in operative relation thereto. The booster, shown at 86, is provided with a conical nose 87 which is fitted into the booster coupling ring 43. The configuration of the ring 43, which is of spider-like construction, provides for efficient venting of the air flow through the missile during a portion of the boost phase.

During the boost phase, air is compressed by the oblique shock waves, as previously described, produced by the conical foward end portion of the innerbody, and the innerbody sections are adjusted as a function of flight Mach number. This air under compression enters the inlet, is burned in the combustor and exits through the nozzle to develop thrust, in the conventional ramjet manner, except that greatly increased speeds are attained.

Obviously many modifications and variations of the present invention are possible in the light of the above teachings. It is therefore to be understood that within the scope of the appended claims the invention may be practiced otherwise than as specifically described.

What is claimed is:

1. In a supersonic combustion ramjet missile,
a body,
an innerbody having a portion within the body and a portion projecting forwardly therefrom,
said innerbody being spaced from said body to define an inlet for compressing an air flow from a hypersonic flight Mach number to a supersonic flight Mach number,
said body having therein a combustion chamber, an exhaust nozzle and a fuel tank,
nozzles in the wall of the combustion chamber for discharging fuel from the tank into said chamber,
means in the body and providing fuel flow rate adjustment as a function of Mach number and altitude to control the fuel-air equivalents ratio to effect desired missile operation,
said means including sensors communicating with the combustion chamber, a distribution valve, a fuel pump and a turbine meter connected between the tank and the valve, a turbine driving the fuel pump, a sensor control unit connected to the valve, one of said sensors being connected to said unit and another to said valve, a computer for controlling said turbine, said turbine meter and said sensor control unit, and means for supplying control signals to the computer representative of pitot and static pressures impinging on the forward end of the innerbody,
said innerbody being shiftable axially within said body in response to Mach number changes, whereby shock waves will be maintained at optimum positions between the body and the innerbody.

2. A supersonic missile as recited in claim 1, wherein the body comprises a forward section, an aft section, and a cowl, and
said innerbody comprises forward and aft sections that are relatively movable with respect to each other and to said body.

3. A supersonic missile as recited in claim 2,
including means mounted within the innerbody for shifting said innerbody sections axially of the body,
said means shifting the forward innerbody section a relatively long distance and the aft innerbody section a relatively short distance,
the shifting of the innerbody sections providing optimum positioning of the shock waves on and within the missile during flight thereof at different Mach numbers.

4. A supersonic missile as recited in claim 3, wherein said means comprises:
a motor having a shaft with a relatively coarse threaded portion and a relatively fine threaded portion,
a nut on the innerbody forward section and receiving said coarse threaded shaft portion,
a nut on the innerbody aft section and receiving said fine threaded shaft portion,
means for controlling operation of the motor, and
pressure operated means for actuating said last mentioned means.

5. A supersonic missile as recited in claim 2, wherein
said innerbody sections include telescoping connected sleeves,
struts mounted in the cowl, and
an annular member secured to the struts,
said annular member engaging one of the sleeves for mounting the innerbody in the body.

6. A supersonic missile as recited in claim 1, including additionally
a booster coupling ring mounted in the open end portion of the exhaust nozzle, and
a booster detachably connected to the missile and having a nose engaging said ring.

7. A supersonic missile as recited in claim 5, wherein
said sleeves are formed with registering slots and said motor is mounted on said annular member and extends through said slots, and
including a housing secured to the motor within the innerbody.

8. A supersonic missile including a body open at its forward end and having a combustion chamber and a fuel tank,
a plurality of outwardly swept wings on the body and arranged in cruciform configuration,
a plurality of steering fins on the body aft of the wings and in symmetry therewith,
nozzles in the body and communicating with the combustion chamber,
means for pumping fuel from the tank to the nozzles,
means in the body for sensing pressures in the combustion chamber,
means connected with said sensing means and operable for controlling said fuel pumping means to provide fuel flow rate adjustment as a function of Mach number and altitude whereby supersonic flow through the combustion chamber will be maintained,
an innerbody having relatively movable conical forward and aft sections,
means mounting the innerbody in the open forward end of the body to project inwardly and outwardly thereof, and
means on said first-mentioned means for moving the sections relative to each other as a function of flight Mach number for positioning shock waves impinging on the missile during flight thereof for optimum missile performance.

9. A supersonic missile as recited in claim 8,
including a booster having a nose engagable in the aft end of the missile for providing a starting impulse therefor.

10. A supersonic missile as recited in claim 8,
wherein said last-mentioned means comprises a motor,
an annular member mounting the motor,
and a plurality of struts mounting the annular member in the missile body.

* * * * *